United States Patent [19]

Keim

[11] Patent Number: 4,537,657
[45] Date of Patent: Aug. 27, 1985

[54] WET STRENGTH RESINS

[75] Inventor: Gerald I. Keim, West Grove, Pa.

[73] Assignee: Hercules Incorporated, Wilmington, Del.

[21] Appl. No.: 663,105

[22] Filed: Oct. 22, 1984

Related U.S. Application Data

[60] Division of Ser. No. 526,304, Aug. 26, 1983, Pat. No. 4,501,862, which is a continuation-in-part of Ser. No. 497,362, May 23, 1983, abandoned.

[51] Int. Cl.³ .................................................. D21H 3/58
[52] U.S. Cl. .................................. 162/164.3; 162/164.6
[58] Field of Search ............... 162/164.3, 164.6, 168.2; 525/430, 435; 524/608, 845; 528/342

[56] References Cited

U.S. PATENT DOCUMENTS

| 3,240,664 | 3/1966 | Earle, Jr. | 162/164 |
| 3,250,664 | 5/1966 | Conte et al. | 162/164 |
| 3,311,594 | 3/1967 | Earle | 260/77.5 |
| 3,645,954 | 2/1972 | Terada et al. | 260/29.2 |
| 3,793,279 | 2/1974 | Lipowski | 260/29.2 EP |
| 3,887,510 | 6/1975 | Chan et al. | 260/29.2 N |
| 3,891,589 | 6/1975 | Ray-Chaudhuri | 260/29.2 EP |
| 4,388,439 | 6/1983 | Maslanka | 524/845 |

Primary Examiner—Peter Chin
Attorney, Agent, or Firm—Hazel L. Deming

[57] ABSTRACT

Disclosed are novel wet strength resins for paper. The resins are produced by reacting an epihalohydrin, such as epichlorohydrin, with an aminopolyamide-polyurey- lene intermediate derived by reacting methylbisamino- propylamine with oxalic acid or a diester of oxalic acid and with urea.

5 Claims, No Drawings

WET STRENGTH RESINS

This application is a division, of application Ser. No. 526,304, filed Aug. 26, 1983, now U.S. Pat. No. 4,501,862 which application is a continuation-in-part of application Ser. No. 497,362 filed May 23, 1983 now abandoned.

This invention relates to the synthesis of wet and dry strength resins for use in the manufacture of paper, the broke of which can be easily and readily repulped.

Broke is a waste product of the paper industry which, if not recovered and utilized, represents a substantial loss. It is customary to repulp the broke and reuse it in the paper-making process. Wet strength broke is difficult to repulp and the repulping of wet strength broke is discussed by Schmalz in TAPPI, Vol. 44, pages 275–280 (April 1961).

Cationic, water-soluble, thermosetting resins derived by the reaction of polyaminoureylenes with epichlorohydrin are known wet strength resins for paper. Typical of these resins are the resins of U.S. Pat. No. 3,240,664 to Earle, Jr. derived by the reaction of epichlorohydrin and a polyaminoureylene produced from a polyalkylene polyamine containing a tertiary amine group such as methylbisaminopropylamine and urea. Cationic, water-soluble thermosetting resins produced by reaction of epichlorohydrin and an aminopolyamide (sometimes referred to as a polyaminoamide or polyaminopolyamide) derived from a $C_3$ to $C_{10}$ saturated dicarboxylic acid and methylbisaminopropylamine are also known and described, for example, in U.S. Pat. No. 3,311,594 to Earle, Jr. See also U.S. Pat. No. 3,793,279 to Lipowski, U.S. Pat. No. 3,887,510 to Chan et al. and U.S. Pat. No. 3,891,589 to Ray-Chaudhuri which disclose the use of diesters derived from $C_2$ to $C_{20}$ saturated dicarboxylic acids in the preparation of aminopolyamides which are subsequently reacted with epichlorohydrin. Further, in U.S. Pat. No. 3,793,279, Lipowski teaches producing cationic wet strength resins by reacting certain chain-extended, amine-terminated base polyamides with epichlorohydrin and discloses that the broke from papers which are treated with these resins is more easily recovered than broke from paper treated with other wet strength resins such as those disclosed in U.S. Pat. No. 2,926,154 to Keim. Lipowski also indicates that acids which decarboxylate, such as oxalic acid, are not suitable for making wet strength resins and shows that the products prepared from diethylenetriamine and oxalic acid, with or without subsequent amine termination and chain extension do not, upon reaction with epichlorohydrin, provide cationic resins having wet strength properties.

Now in accordance with this invention it has been found that the resins prepared by reacting an epihalohydrin, such as epichlorohydrin, with aminopolyamide-polyureylene intermediates derived by the reaction of methylbisaminopropylamine with oxalic acid or its diester and with urea impart good wet strength to paper and that the paper can be repulped using relatively mild repulping conditions. Accordingly, the present invention relates to a process for preparing an aqueous solution of a water-soluble, cationic thermosetting resin which process comprises reacting methylbisaminopropylamine with (a) oxalic acid or a diester of oxalic acid and (b) urea to form an aminopolyamide-polyureylene intermediate containing tertiary amine groups, the mole ratio of (a) to (b) being from about 0.1:1 to about 10:1 and the mole ratio of methylbisaminopropylamine to (a) plus (b) being from about 0.9:1 to about 1.2:1, and reacting the intermediate in aqueous solution with from about 1 mole to about 1.5 moles of an epihalohydrin per mole of tertiary amine groups present in said intermediate.

In the preparation of the resins of this invention oxalic acid or its diester and urea are contacted with methylbisaminopropylamine to produce a reaction intermediate containing amide and ureylene linkages. The preferred diesters of oxalic acid are the lower alkyl esters and particularly dimethyl oxalate, diethyl oxalate, and dipropyl oxalate. The methylbisaminopropylamine reactant, also referred to in the art as N-bis(aminopropyl)methylamine, has the formula

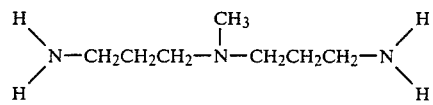

Reaction of oxalic acid or its diester and urea with the amine is preferably carried out neat, but can also be carried out in a solution or dispersion of the reactants in a suitable solvent such as water, alcohols and the like. In the usual procedure oxalic acid or its diester is added gradually to the amine over a period of time sufficient to maintain the temperature at about 100°–125° C. to prevent decomposition of the acid or ester prior to reaction with the amine. Next the temperature is raised to about 150° C. to about 200° C. and maintained thereat for a length of time sufficient to remove the water of polycondensation and produce the diamide of oxalic acid. Then sufficient urea is added to react with substantially all of the unreacted methylbisaminopropylamine remaining in the reaction mixture and the temperature is maintained at about 120° to 240° C. and preferably between about 150° C. and 200° C. for about ½ to 2 hours to complete the reaction. Time of reaction depends on temperature and is inversely proportional thereto. Usually a total of from about 3 to about 7 hours are required to complete the reaction of oxalic acid or its diester and urea with the amine.

In the above reaction, the mole ratio of oxalic acid or its diester to urea will range from about 0.1:1 to about 10:1, preferably from about 0.2:1 to about 4:1 and more preferably from about 0.25:1 to about 4:1 and the preferred mole ratio of methylbisaminopropylamine to total acid components, i.e. oxalic acid or its diester plus urea, is from about 0.9:1 to about 1.2:1 and more preferably about 1:1.

In converting the polyamide-polyureylene intermediate to a water-soluble, cationic, thermosetting resin, the polyamide-polyureylene is reacted in aqueous solution with an epihalohydrin, preferably epichlorohydrin. The reaction is carried out in solution, using the polyamide-polyureylene intermediate in the form of its water-soluble acid salt in those cases where the free amine form has limited water solubility. Usually the pH of the aqueous solution of the intermediate is adjusted to about 8.5 to about 9.6 before or immediately after the addition of the epihalohydrin, and the temperature of the reaction medium is maintained at from about 40° C. to about 100° C. and preferably from about 45° C. to 85° C. until the viscosity of a 25% solids solution at 25° C. has reached about E-F or higher on the Gardner-Holdt scale or the Spence-Spurlin viscosity is at least about 20 and preferably ranges from about 22 to about 30 seconds.

The acid salt of the aminopolyamide-polyureylene intermediate is easily and readily prepared by adding to an aqueous dispersion of the intermediate a water-soluble acid such as hydrochloric acid in an amount essentially stoichiometrically equivalent to the tertiary amines of the aminopolyamide-polyureylene intermediate whereby essentially all the tertiary amines are converted to the ammonium salt. Suitable acids for salt formation are water-soluble, are within the skill of the art and include inorganic acids such as sulfuric acid, hydrochloric acid, nitric acid and phosphoric acid and organic acids such as acetic acid.

In the aminopolyamide-polyureylene-epihalohydrin reaction, it is preferred to use sufficient epihalohydrin to convert all tertiary amine groups to quaternary ammonium groups. Satisfactory resins can be prepared by using from about 1 mole to about 1.5 moles and preferably from about 1.2 to about 1.4 moles of epihalohydrin per mole of tertiary amine of the intermediate. When the desired viscosity is reached, sufficient additional water is added to adjust the solids content of the resin solution to about 15% or less and the product is cooled to room temperature, about 25° C. The resin will contain a plurality of reactive

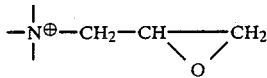

groups.

The resin is preferably stabilized against premature gelation by converting essentially all the reactive

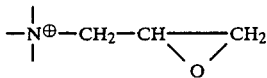

groups to inactive

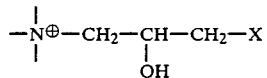

groups, X being the halogen of the epihalohydrin and chlorine when the epihalohydrin is epichlorohydrin.

The stabilization is accomplished by adding a water-soluble acid, preferably a hydrogen halide acid such as hydrochloric acid to the resin solution until essentially all the reactive groups are changed to the inactive form. This is accomplished by adding sufficient water-soluble acid to obtain and maintain a pH of from about 1 to 3. The reactive groups are thereby changed to the inactive form and the resin solution will be stabilized against gelation. When the pH remains at the desired pH for a period of about one-half hour at room temperature (about 25° C.) it is relatively certain the pH will not change and the resin solution is stabilized against gelation. By this means, stable solutions having a resins solids content of from about 10% to about 50% can be prepared.

Hydrogen halide acids that can be employed in the above stabilization procedure are hydrochloric acid, hydrobromic acid, hydrofluoric acid, and hydroiodic acid. Water-soluble acids other than hydrogen halide acids can be used if the halide ion concentration of the reaction mixture is sufficiently high, e.g., at least 0.1N, and the reactivity or nucleophilicity of the acid anion is sufficiently low that the epoxide groups are converted essentially completely to the halohydrin. Examples of other water-soluble acids that can be employed include sulfuric acid, nitric acid, phosphoric acid and acetic acid. Mixtures of two or more water-soluble acids can be used if desired.

Prior to use in the paper mill the stabilized resin is "reactivated" by adjusting the pH of the resin solution to and maintaining it above 8, preferably 10.5 and higher. Preferred pH range is 10.5 to 12.0. This reconverts essentially all the inactive

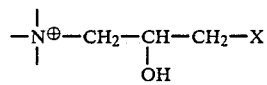

groups to the reactive cross-linking

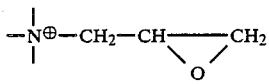

groups. This pH adjustment is made by the addition of a suitable organic or inorganic base such as the alkali metal hydroxides and carbonates, calcium hydroxide, benzyltrimethylammonium hydroxide, and tetramethylammonium hydroxide. The alkali metals include sodium, potassium, cesium and lithium. The base is added preferably as an aqueous solution.

The resins, prepared as herein described, may be incorporated into pulp slurry at any point on the wet end of the paper machine. However, prior to use, the stabilized resin must be reactivated as above set forth to convert the halohydrin groups to epoxide groups.

The resins of this invention exhibit high "off-the-machine" wet strength and moderate to high dry strength. For most purposes, adequate wet strength can be obtained by incorporating into the paper from about 0.2% to about 3% of the resin based on the dry weight of the pulp.

The invention is further illustrated by the following examples which demonstrate the best known embodiments of the invention. In these examples, intrinsic viscosity (I.V.) measurements were determined at 25° C. on a 2% solution in 1M ammonium chloride and Brookfield viscosity measurements were determined at 25° C., using a #1 spindle at 60 r.p.m. unless otherwise indicated.

EXAMPLE 1

Part A

Methylbisaminopropylamine (145.3 grams, 1 mole), urea (48.0 grams, 0.8 mole) and dimethyl oxalate (23.6 grams, 0.2 mole) were charged to a reaction vessel equipped with stirrer, thermometer, heating mantle, nitrogen sparge and water trap with condenser. The charge was heated gradually to 125° C., maintained at 125° C. for 20 minutes and then heated to 240° C. over a period of about 2 hours, the methanol and urea by-products being collected during the course of the reaction. The reaction mass was held at 240° C. for about 25 minutes, following which time the temperature was reduced to 130° C. Next, 97.8 grams of 37% aqueous HCl and 116 ml of water were added and the mixture was thoroughly agitated at 100° C. for about 1 hour to provide an aqueous solution of the resulting salt, additional aqueous HCl being added as necessary to maintain the pH below 5.6. A clear yellow viscous solution having a pH of 4.55 and a solids content of 54.5% was obtained. Examination of the solid product by nuclear magnetic resonance ($C_{13}$NMR) indicated that the product was an aminopolyamide-polyureylene containing 20 mole % of oxamide moieties. The product had an I.V. of 0.163.

Part B 52.5 grams of the solution of Part A, 160.2 ml of water and 17.4 grams (0.188 mole) of epichlorohydrin were placed in a reaction vessel and the pH of the solution was adjusted to 9.6 with 21.1 grams of 20% aqueous NaOH. The temperature of the resulting solution was raised to 65°–70° C. and the viscosity of the solution was monitored. When the Spence-Spurlin viscosity reached 10 seconds, additional 20% aqueous NaOH was added to adjust the pH to 8.2. When the Spence-Spurlin viscosity reached 23 seconds, 40 ml of water were added and the pH was adjusted to 2 with 37% aqueous HCl. Periodic pH adjustments were made until the pH of 2 was constant for about 30 minutes. The resulting solution had a solids content of 18.7% by weight and a Gardner-Holdt viscosity of C at 25° C.

EXAMPLE 2

Part A

Methylbisaminopropylamine (1.0 mole) and dimethyl oxalate (0.4 mole) were charged to a reaction vessel equipped with stirrer, thermometer, heating mantle, nitrogen sparge and water trap with condenser and the charge was heated gradually to 150° C. over a period of 1 hour. The charge was maintained at 150° C. until most of the methanol by-product was collected and then the temperature was lowered to 90° C. Next, urea (0.6 mole) was added to the vessel and the temperature was increased incrementally to 225° C. over about a 2 hour period at which time ammonia liberation had ceased and the reaction was considered complete (based on titration of the ammonia collected). The temperature of the reaction product was lowered to 130° C. and the product was thoroughly mixed with 101.2 grams of 37.3% aqueous HCl and 120 ml of water to provide a 55.0% aqueous solution of the resulting salt, the pH of the solution being 3.90. Examination of the solid product by $C_{13}$NMR indicated that the product was an aminopolyamide-polyureylene containing 40 mole % of oxamide moieties. The product had an I.V. of 0.168.

Part B 59.7 grams of the solution of Part A, 176 ml of water and 18.8 grams (0.203 mole) of epichlorohydrin were placed in a reaction vessel and the pH of the solution was adjusted to 9.20 with 21.1 grams of 20% aqueous NaOH. The temperature of the resulting solution was raised to 65°–67° C. and the viscosity of the solution was monitored. When the Spence-Spurlin viscosity reached 2.5 seconds, additional 20% aqueous NaOH was added to adjust the pH to 8.00. When the Spence-Spurlin viscosity reached 25.0 seconds, 100 ml of water were added and the pH was adjusted to 2 with 37% aqueous HCl. Periodic pH adjustments were made until the pH of 2 was constant for about 30 minutes. The resulting solution had a solids content of 13.6% by weight and a Gardner-Holdt viscosity of B at 25° C.

EXAMPLES 3 AND 4

A 50:50 by weight mixture of Rayonier bleached kraft pulp and Weyerhaeuser bleached hardwood kraft pulp was beaten to a Canadian Standard freeness of 500 cc in a Noble and Wood cycle beater. The pulp was then adjusted to pH 7.5 with 10% NaOH and varying amounts, as specified in Table I, based on the dry weight of pulp, of the aminopolyamide-polyureylene-epichlorohydrin resins prepared in Examples 1 and 2 were added. The solutions of Examples 1 and 2 were reactivated for use by diluting 20 grams of each solution to about 3% solids with water, and adding, with mixing, sufficient 1N sodium hydroxide and water to provide a solution having a resin solids content of about 2% and a pH of about 11. The pulp was sheeted on a Noble and Wood handsheet machine to provide handsheets having a basis weight of approximately 40 pounds per ream (3000 square feet) and the resulting handsheets were wet pressed to a 33% solids content and then dried at 105° C. for 45 seconds on a steam heated drum drier to 3–4% moisture. The dry strength was tested "uncured" (after 7 days of natural aging) or "cured" (after 30 minutes at 80° C.). The sheets tested for wet strength were soaked for two hours in distilled water. Results are listed in Table I.

TABLE I

| Ex. No. | Resin of | Addition % of pulp | Basis Weight | Tensile Strength (lbs/inch) | | | |
|---|---|---|---|---|---|---|---|
| | | | | Dry | | Wet | |
| | | | | Uncured | Cured | Uncured | Cured |
| 3 | Ex. 1 | 0.25 | 39.9 | 21.8 | 23.2 | 3.94 | 4.43 |
| | | 0.50 | 39.6 | 22.0 | 22.2 | 4.98 | 5.44 |
| | | 0.75 | 39.9 | 24.8 | 26.5 | 5.84 | 6.55 |
| 4 | Ex. 2 | 0.25 | 40.0 | 21.9 | 24.2 | 3.99 | 4.35 |
| | | 0.50 | 39.5 | 23.6 | 25.6 | 5.40 | 6.01 |
| | | 0.75 | 39.9 | 24.4 | 23.8 | 5.23 | 5.86 |
| Blank | — | | 40.0 | 19.6 | 19.9 | 0.59 | 0.64 |

EXAMPLE 5

Part A

Methylbisaminopropylamine (145.3 grams, 1.0 mole) was charged to a reaction vessel equipped with stirrer, thermometer, heating mantle, nitrogen sparge and water trap with condenser and the charge was heated to 130° C. Anhydrous oxalic acid (43.2 grams, 0.48 mole) was dissolved in 70 ml of water at 70°–75° C. and the oxalic acid solution was added dropwise to the vessel over a period of about 40 minutes while maintaining the contents at 115°–130° C. After completion of the addition, the temperature was raised to 180°–184° C. over a period of about 3 hours and maintained thereat until the water was removed. The temperature of the reaction mass was next decreased to 90° C. and 31.3 grams (0.52 mole) of urea were added. The temperature of the mixture was gradually raised to 180°–183° C. and maintained thereat for 1.25 hours while the ammonia was removed. Next the temperature was reduced to about 150° C. and the product was thoroughly mixed with 98.6 grams of 37% aqueous HCl and 160 ml of water to provide an aqueous solution of the resulting salt, the pH of the solution being 2.0. The resulting solution had a total solids of 48.6% by weight. Examination by $C_{13}$NMR indicated that the product was an aminopolyamide-polyureylene. The product had an I.V. of 0.183.

Part B 66.0 grams of the solution of Part A and 169 ml of water were charged to a reaction vessel and the charge was adjusted to a pH of 8.65 with 24.4 grams of 20% aqueous NaOH. Epichlorohydrin (18.7 grams, 0.203 mole) was added giving 20% reaction solids, the temperature of the resulting solution was raised to 50°–52° C. and the viscosity of the solution was monitored. When the Spence-Spurlin viscosity reached 25 seconds, 50 ml of water were added and the pH was adjusted to 2 with 37% aqueous HCl. The temperature was increased to 65° C. and periodic pH adjustments were made until the pH of 2 was constant for about 1 hour. The resulting solution had a total solids content of 15.1% by weight and a Gardner-Holdt viscosity of C at 25° C.

EXAMPLE 6

Part A

Anhydrous oxalic acid (63.0 grams, 0.70 mole) and 100 ml of water were charged to a reaction vessel equipped with stirrer, thermometer, heating mantle, nitrogen sparge and water trap with condenser and the charge was heated to 110° C. Methylbisaminopropylamine (145.3 grams, 1.0 mole) was added dropwise over a period of 50 minutes, following which time the temperature of the reaction mass was raised to 180° C. over 2.83 hours and maintained at 180° C. until the water of polycondensation was removed. The temperature of the reaction mass was next reduced to 50° C. and urea (18.0 grams, 0.30 mole) was added. The temperature was then raised to 180° C. over a period of 40 minutes and maintained at 180° C. while the by-product ammonia was collected (about 35 minutes). The temperature was next decreased to 150° C., 102 grams of 37% aqueous HCl and 165.2 ml of water were added and the mixture was thoroughly agitated at 90° C. to provide an aqueous solution of the resulting salt. A clear yellow viscous solution having a pH of 2.8, a solids content of 45.0% and an I.V. of 0.127 was obtained.

Part B 74.6 grams of the solution of Part A and 114 ml of water were charged to a reaction vesel and the charge was adjusted to a pH of 9.0 with 20.5 grams of 20% aqueous NaOH. Epichlorohydrin (18.0 grams, 0.195 mole) was added dropwise, giving 25% reaction solids, and the temperature was raised to 50° C. and the viscosity of the solution was monitored. When the Spence-Spurlin viscosity reached 30 seconds, 50 ml of water were added and the pH was adjusted to 0.5 with 10 grams of 37% aqueous HCl. The temperature was increased to 65° C. and periodic pH adjustments were made until a pH of 2 was constant for about 30 minutes. The resulting solution had a total solids content of 19.0% by weight and a Gardner-Holdt viscosity of D+ at 25° C.

EXAMPLES 7 AND 8

The resin solutions of Examples 5 and 6 were activated for use using the procedure set forth in Examples 3 and 4, and paper sheets were prepared using the resulting solutions and tested in accordance with the procedure of Examples 3 and 4. Strength properties of the sheets are set forth in Table II below.

TABLE II

| Ex. No. | Resin of | Addition % of pulp | Basis Weight | Tensile Strength (lbs/inch) | | | |
|---|---|---|---|---|---|---|---|
| | | | | Dry | | Wet | |
| | | | | Uncured | Cured | Uncured | Cured |
| 7 | Ex. 5 | 0.25 | 40.0 | 21.5 | 22.3 | 4.11 | 4.90 |
| | | 0.50 | 40.0 | 25.0 | 25.7 | 5.46 | 6.47 |
| | | 0.75 | 40.0 | 23.7 | 24.2 | 5.55 | 6.33 |
| 8 | Ex. 6 | 0.25 | 40.0 | 21.8 | 22.9 | 3.91 | 4.63 |
| | | 0.50 | 40.0 | 22.3 | 23.5 | 4.83 | 5.87 |
| | | 0.75 | 40.0 | 24.1 | 25.2 | 5.43 | 6.47 |
| Blank | — | — | 40.0 | 19.3 | 19.5 | 0.64 | 0.65 |

EXAMPLES 9 TO 11

Handsheets were prepared in accordance with the procedure of Examples 3 and 4 using 0.25% (based on the dry weight of the pulp) of the resins of Examples 2, 5 and 6. Samples of uncured handsheets were repulped in aqueous NaOH at a pH of 12 and at a temperature of 85° C. Repulping of the paper sheets was carried out according to TAPPI method 205 m-58 at a mixer speed of 2800 r.p.m., a pulp consistency of 1.3% and a pH of 12. The degree of repulping (fiber separation) was measured and reported in integers ranging from 1–6, the integer 6 indicating substantially complete repulping. Test results are set forth in Table III below.

TABLE III

| Ex. No. | Resin of | Degree of Repulping (after minutes) | | | | | |
|---|---|---|---|---|---|---|---|
| | | 5 | 10 | 20 | 30 | 40 | 50 |
| 9 | 2 | 1 | 2 | 4 | 5 | 5 | 6 |
| 10 | 5 | <1 | 2 | 4 | 5 | 6 | |
| 11 | 6 | 1 | 3 | 5 | 6 | | |

EXAMPLE 12

Part A

Methylbisaminopropylamine (889.3 grams, 6.12 moles) and 50 ml of water were charged to a resin kettle equipped with stirrer, thermometer, heating mantle, nitrogen sparge and water trap with condenser and the charge was heated to 135° C. Anhydrous oxalic acid (324.1 grams, 3.6 moles) was dissolved in 446 ml of water at 75°–80° C. and the oxalic acid solution was added dropwise to the kettle over a period of 1.5 hours while maintaining the contents at 122°–136° C. After completion of the addition, the temperature was raised to 175° C. over a period of 1.8 hours and maintained thereat until the water was removed. The temperature of the reaction mass was next decreased to 90° C. and urea (144.1 grams, 2.4 moles) was added. The temperature of the mixture was gradually raised to 190° C. and maintained thereat until the evolution of ammonia ceased. A very viscous clear yellow aminopolyamide-polyureylene having an I.V. of 0.206 resulted and was poured into an aluminum pan. The above procedure was repeated three times and the products were combined.

Part B

The combined products of Part A (3313 grams), 3806 ml of water and 1780.4 grams of 37% aqueous HCl were thoroughly mixed to provide a 45.2% aqueous solution of the resulting salt, the pH of the solution being 2.8. Examination by $C_{13}$NMR indicated that the product contained 63.7 mole % oxamide moieties. The resulting salt had an I.V. of 0.171. A portion (1366.5 grams) of the salt solution and 2096 ml of water were placed in a reaction vessel and the pH of the solution was adjusted to 9.0 with 366.0 grams of 20% aqueous NaOH. Epichlorohydrin (343.4 grams, 3.71 moles) was added, the temperature of the resulting solution was raised to 50° C. and the viscosity of the solution was monitored. When the Spence-Spurlin viscosity reached 30 seconds, the pH was adjusted to 0.4 with 37% aqueous HCl. Periodic pH adjustments were made until a pH of 2 was constant for 1 hour. Five additional portions of the salt solution were reacted with epichlorohydrin, as above, and the resulting solutions combined to give a composite solution having a total solids content of 17.4% by weight, a Gardner-Holdt viscosity of B, and a Brookfield viscosity of 31.3 cps. Examination of the composite product by $C_{13}NMR$ indicated that 95.8 mole % of the teriary amine groups were quaternized.

EXAMPLES 13 TO 15

The composite resin solution of Example 12 was activated for use using the procedure set forth in Examples 3 and 4 and paper sheets were prepared using the resulting solution and the mixture of bleached kraft pulp of Examples 3 and 4 (Example 13), Chesapeake unbleached kraft pulp (Example 14) or Manitoba unbleached kraft pulp (Example 15). Strength properties of the sheets are set forth in Table IV below.

TABLE IV

| Ex. No. | % of Resin Added | Basis Weight | Tensile Strength (lbs/inch) | | | |
|---|---|---|---|---|---|---|
| | | | Dry | | Wet | |
| | | | Uncured | Cured | Uncured | Cured |
| 13 | 0.25 | 39.6 | 22.2 | 23.0 | 4.10 | 4.50 |
| | 0.50 | 40.1 | 23.6 | 22.7 | 5.05 | 5.55 |
| | 0.75 | 39.7 | 22.7 | 23.5 | 5.45 | 6.06 |
| Blank | — | 39.5 | 17.9 | 18.2 | 0.55 | 0.49 |
| 14 | 0.25 | 39.9 | 26.2 | 25.7 | 4.57 | 4.64 |
| | 0.50 | 39.7 | 25.7 | 25.7 | 5.53 | 6.16 |
| | 0.75 | 40.1 | 26.8 | 28.9 | 6.75 | 7.24 |
| Blank | — | 41.1 | 21.7 | 21.8 | 0.68 | 0.67 |
| 15 | 0.25 | 40.0 | 23.2[1] | 23.4 | 4.47[1] | 4.79 |
| | 0.50 | 40.0 | 25.6[1] | 27.1 | 6.11[1] | 6.90 |
| Blank | — | 41.3 | 23.7 | 23.3 | 0.71 | 0.72 |

[1]after 10 days of natural aging.

Samples of the uncured sheets containing 0.25% resin (based on dry weight of the pulp) of Examples 13 to 15 were aged naturally for extended periods of time and then repulped according to the procedure of Examples 9 to 11. The test results are set forth in Table V below.

TABLE V

| Sheet of Ex. No. | Days of Natural Aging | Degree of Repulping (after minutes) | | | | | | |
|---|---|---|---|---|---|---|---|---|
| | | 5 | 10 | 20 | 30 | 40 | 50 | 60 |
| 13 | 14 | <1 | 2 | 4 | 5 | 6 | | |
| 14 | 14 | <1 | <1 | 1 | 2 | 3 | 3 | 4 |
| 15 | 35 | <1 | 2 | 4 | 5 | 5 | 6 | |

EXAMPLE 16

Part A

Methylbisaminoproplyamine (290.6 grams, 2.0 moles) and 50 ml of water were charged to a resin kettle equipped with stirrer, thermometer, heating mantle, nitrogen sparge and water trap with condenser and the charge was heated to 124° C. Oxalic acid dihydrate (201.7 grams, 1.6 moles) was dissolved in 160 ml of water at 70°–80° C. and the oxalic acid solution was added dropwise to the kettle over a period of 35 minutes. After completion of the addition, the temperature was raised to 185° C. over a period of 1.2 hours and maintained thereat until the water was removed. The temperature of the reaction mass was next decreased to 155° C. and urea (24.0 grams, 0.4 mole) as a warm (60° C.) 50% aqueous solution was added dropwise while maintaining the reaction mixture at 155°–158° C. After completion of the urea addition the temperature of the mixture was gradually raised to 185° C. and maintained thereat until the evolution of ammonia ceased. Part of the resulting molten aminopolyamide-polyureylene product was isolated as the neat free amine and had an I.V. of 0.206. The remaining portion of the product was converted to its ammonium chloride salt by adding 143.4 grams of 37.9% aqueous HCl and 400 ml of water and agitating the mixture thoroughly at 90° C. to provide an aqueous solution of the resulting salt. A clear yellow solution having a pH of 4.0, a solids content of 40.6% and a Brookfield viscosity of 70.3 cps at 25° C. was obtained. The salt had an I.V. of 0.181.

Part B 226.9 grams of the solution of Part A and 188.2 ml of water were charged to a reaction vessel and the charge was adjusted to a pH of 8.65 with 32 grams of 20% aqueous NaOH. Epichlorohydrin (46.3 grams, 0.5 mole) was added quickly giving 30% reaction solids, and the temperature was raised to 50° C. and the viscosity of the solution was monitored. When the Spence-Spurlin viscosity reached 50 seconds, the pH was adjusted to 0.6 with 17.9 grams of 37.9% aqueous HCl. The temperature was increased to 60° C. and periodic pH adjustments were made until a pH of 2 was constant for about 30 minutes. The resulting solution had a total solids content of 22.7% by weight, a Gardner-Holdt viscosity of E at 25° C. and a Brookfield viscosity of 92.6 cps at 25° C.

EXAMPLE 17

Part A

The procedure of Example 16, Part A was repeated except that 226.9 grams (1.8 moles) of oxalic acid dihydrate and 12.0 grams (0.2 mole) of urea were used. The resulting molten aminopolyamide-polyureylene isolated as the neat free amine had an I.V. of 0.101, and the aqueous solution of its HCl salt had a pH of 4.3, a solids content of 44.3%, a Brookfield viscosity of 36.5 cps at 25° C. and an I.V. of 0.086.

Part B 213.2 grams of the solution of Part A and 209.5 ml of water were charged to a reaction vessel and the charge was adjusted to a pH of 8.50 with 48 grams of 20% aqueous NaOH. Epichlorohydrin (46.3 grams, 0.5 mole) was added quickly giving 30% reaction solids. The temperature of the reaction mixture was raised to 65° C. and the viscosity of the solution was monitored. When the Spence-Spurlin viscosity reached 32 seconds, the pH was adjusted to 0.3 with 37.9% aqueous HCl. The temperature was maintained at 65° C. for an additional 3 hours and periodic pH adjustments were made with 20% aqueous NaOH to provide a product solution having a pH of 1.8. The resulting solution had a total solids content of 22.8% by weight, a Gardner-Holdt viscosity of C and a Brookfield viscosity of 50.3 cps at 25° C.

EXAMPLES 18 AND 19

The resin solutions of Examples 16 and 17 were activated for use using the procedure set forth in Examples 3 and 4, and paper sheets were prepared using the resulting solutions and tested in accordance with the procedure of Examples 3 and 4. Strength properties of the sheets are set forth in Table VI below.

TABLE VI

| Ex. No. | Resin of | Addition % of pulp | Basis Weight | Dry Uncured | Dry Cured | Wet Uncured | Wet Cured |
|---|---|---|---|---|---|---|---|
| 18 | Ex. 16 | 0.25 | 40.3 | 22.0 | 22.5 | 3.53 | 4.48 |
|  |  | 0.50 | 40.3 | 22.7 | 22.9 | 4.46 | 5.46 |
|  |  | 0.75 | 39.5 | 22.1 | 22.8 | 5.04 | 5.97 |
| 19 | Ex. 17 | 0.25 | 40.4 | 19.6 | 20.5 | 2.41 | 2.87 |
|  |  | 0.50 | 39.7 | 21.3 | 21.5 | 3.28 | 3.66 |
|  |  | 0.75 | 40.6 | 21.5 | 23.0 | 4.00 | 5.23 |
| Blank | — |  | 40.0 | 20.1 | 20.1 | 0.62 | 0.63 |

The uncured sheets containing 0.25% resin (based on dry weight of the pulp) were repulped according to the procedure of Examples 9 to 11. The test results are set forth in Table VII below.

TABLE VII

| Ex. No. | Degree of Repulping (after minutes) | | |
|---|---|---|---|
|  | 5 | 10 | 20 |
| 18 | 2 | 5 | 6 |

TABLE VII-continued

| Ex. No. | Degree of Repulping (after minutes) | | |
|---|---|---|---|
|  | 5 | 10 | 20 |
| 19 | 5 | 6 |  |

What I claim and desire to protect by Letters Patent is:

1. A paper product having wet and dry strength and improved repulpability comprising sheeted cellulose fibers treated with from about 0.2 to about 3% by weight, based on dry weight of fibers, of a water-soluble, cationic thermosetting resin derived by reacting methylbisaminopropylamine with (a) oxalic acid or a lower alkyl diester of oxalic acid and (b) urea to form an aminopolyamide-polyureylene containing tertiary amine groups, the mole ratio of (a) to (b) being from about 0.1:1 to about 10:1 and the mole ratio of methybisaminopropylamine to (a) plus (b) being from 0.9:1 to about 1.2:1 and then reacting the intermediate in aqueous solution with from about 1 mole to about 1.5 moles of epihalohydrin per mole of tertiary amine groups present in said intermediate.

2. The paper product of claim 1 wherein the epihalohydrin is epichlorohydrin.

3. The paper product of claim 2 wherein the mole ratio of (a) to (b) is about 0.25:1 to about 4:1.

4. The paper product of claim 3 wherein (a) is oxalic acid.

5. The paper product of claim 3 wherein (a) is dimethyl oxalate or diethyl oxalate.

* * * * *